(12) United States Patent
Rhee

(10) Patent No.: US 9,996,130 B2
(45) Date of Patent: Jun. 12, 2018

(54) METHOD AND APPARATUS FOR CONTROLLING A CONNECTION INTERFACE

(71) Applicant: Samsung Electronics Co., Ltd., Gyeonggi-do (KR)

(72) Inventor: Bongjae Rhee, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 918 days.

(21) Appl. No.: 14/311,932

(22) Filed: Jun. 23, 2014

(65) Prior Publication Data

US 2015/0008749 A1 Jan. 8, 2015

(30) Foreign Application Priority Data

Jul. 4, 2013 (KR) ........................ 10-2013-0078218

(51) Int. Cl.
| | |
|---|---|
| G06F 1/26 | (2006.01) |
| H01R 27/00 | (2006.01) |
| H01R 29/00 | (2006.01) |
| H02J 1/00 | (2006.01) |
| H01R 13/66 | (2006.01) |

(52) U.S. Cl.
CPC ............ G06F 1/266 (2013.01); H01R 27/00 (2013.01); H01R 29/00 (2013.01); *H01R 13/6683* (2013.01); *H02J 2001/008* (2013.01); *Y10T 307/696* (2015.04)

(58) Field of Classification Search
CPC ................................. H01R 29/00; H01R 27/00
See application file for complete search history.

(56) References Cited

U.S. PATENT DOCUMENTS

| | | | | |
|---|---|---|---|---|
| 7,310,697 B2* | 12/2007 | Pandit | ..................... | G06F 1/266 |
| | | | | 455/572 |
| 7,843,084 B2* | 11/2010 | Wang | ...................... | H02J 1/108 |
| | | | | 307/80 |
| 8,073,499 B2* | 12/2011 | Ruff | ........................ | H04M 1/24 |
| | | | | 455/557 |
| 8,476,960 B1* | 7/2013 | Zhou | ..................... | G06F 13/385 |
| | | | | 327/379 |
| 2005/0039060 A1* | 2/2005 | Okayasu | ............... | G06F 13/409 |
| | | | | 713/300 |
| 2007/0046106 A1* | 3/2007 | Shintomi | ................ | H02J 9/061 |
| | | | | 307/64 |

(Continued)

FOREIGN PATENT DOCUMENTS

| | | | |
|---|---|---|---|
| KR | 10-2011-0015742 A | | 2/2011 |
| KR | 20110015742 A | * | 2/2011 |

*Primary Examiner* — Thienvu Tran
*Assistant Examiner* — Pinping Sun
(74) *Attorney, Agent, or Firm* — Cha & Reiter, LLC

(57) ABSTRACT

An electronic device is provided including a processor; a connection unit including a power supply terminal and an identification terminal; a first switch coupled to the power supply terminal and the processor; a second switch coupled to the identification terminal and the processor; and an interface control circuit configured to control an amount of current supplied to the processor by opening or closing each of the first switch and the second switch in accordance with voltage that is applied to at least one of the power supply terminal and the identification terminal by an external device connected to the connection unit.

10 Claims, 14 Drawing Sheets

(56) References Cited

U.S. PATENT DOCUMENTS

| | | | | |
|---|---|---|---|---|
| 2008/0265838 A1* | 10/2008 | Garg | ................... | G06F 1/266 320/115 |
| 2010/0169534 A1* | 7/2010 | Saarinen | ............... | G06F 13/385 710/316 |
| 2010/0244587 A1* | 9/2010 | Tiovola | ............... | G06F 13/4081 307/130 |
| 2010/0262723 A1* | 10/2010 | Rolin | ................... | G06F 21/74 710/8 |
| 2012/0049931 A1* | 3/2012 | Yamada | ............... | H03K 17/063 327/434 |
| 2012/0254478 A1* | 10/2012 | Wada | ................... | G06F 13/00 710/15 |
| 2013/0015808 A1* | 1/2013 | Lee | ................... | G06F 1/263 320/103 |
| 2013/0138838 A1* | 5/2013 | Kim | ................... | H04M 1/6058 710/14 |
| 2013/0275779 A1* | 10/2013 | He | ................... | G06F 1/266 713/300 |
| 2014/0312701 A1* | 10/2014 | Hong | ................... | H02J 7/008 307/80 |
| 2014/0319908 A1* | 10/2014 | Bogdanik | ................ | H02J 1/10 307/9.1 |

* cited by examiner

FIG. 1
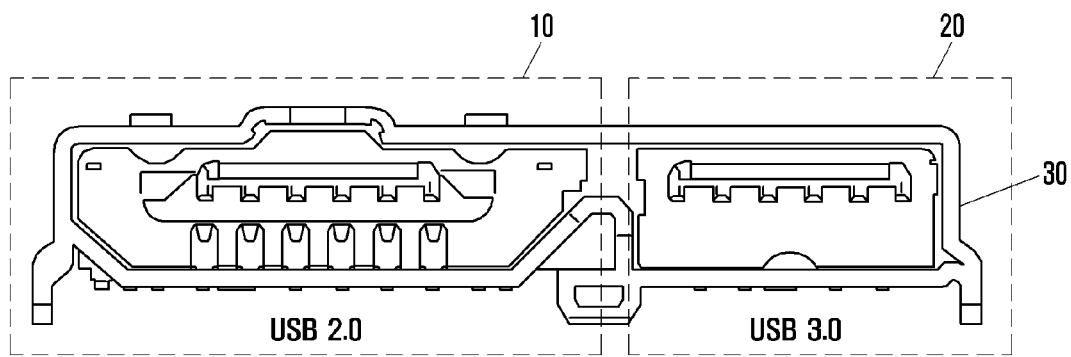
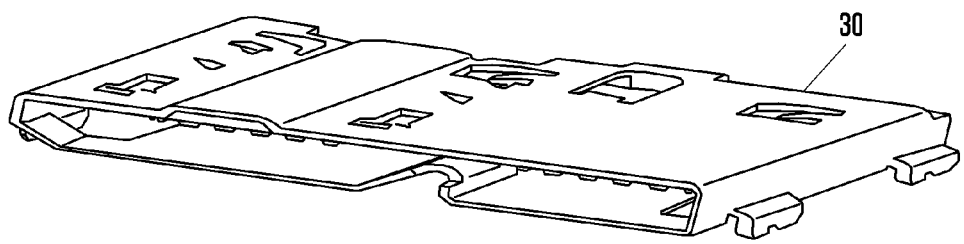

FIG. 3

▲ EXISTING STRUCTURE

| Terminal | | 1 | 2 | 3 | 4 | 5 | 6 | 7 | 8 | 9 | 10 | 11 |
|---|---|---|---|---|---|---|---|---|---|---|---|---|
| User Mode | | VBUS | USB 2.0 DM | USB 2.0 DP | | | MHL DM | MHL DP | MHL ID | GND | USB 2.0 ID | GND |
| Factory Mode | | VBUS | USB 2.0 DM | USB 2.0 DP | V_BAT | V_BAT | MHL DM | MHL DP | MHL ID | GND | USB 2.0 ID | GND |

▲ IMPROVED IDEA

| Terminal | | 1 | 2 | 3 | 4 | 5 | 6 | 7 | 8 | 9 | 10 | 11 |
|---|---|---|---|---|---|---|---|---|---|---|---|---|
| User Mode (USB ID ≪ V_BAT) | USB2.0/MHL | VBUS | USB DM (2.0/3.0) COMMON USE | USB DP (2.0/3.0) COMMON USE | VBUS | | MHL DM | MHL DP | MHL ID | GND | USB ID (2.0/3.0) COMMON USE | GND |
| | USB3.0 | | | | | USB 3.0 Rx− | USB 3.0 Rx+ | USB 3.0 Tx− | USB 3.0 Tx+ | | | |
| Factory Mode (USB ID = V_BAT) | USB2.0/MHL | V_BAT | USB DM (2.0/3.0) COMMON USE | USB DP (2.0/3.0) COMMON USE | V_BAT | | MHL DM | MHL DP | MHL ID | GND | V_BAT (ID FUNCTION & INITIAL POWER) | GND |
| | USB3.0 | | | | | USB 3.0 Rx− | USB 3.0 Rx+ | USB 3.0 Tx− | USB 3.0 Tx+ | | | |

<SECOND FACTORY MODE>

FIG. 9

USB3.0 to HDMI converter

| Terminal | 1 | 2 | 3 | 4 | 5 | 6 | 7 | 8 | 9 | 10 | 11 |
|---|---|---|---|---|---|---|---|---|---|---|---|
| User Mode (USB ID ≪ V_BAT) | VBUS | USB DM | USB DP | USB3.0 Tx- | USB3.0 Tx+ | VBUS | USB3.0 Rx- | USB3.0 Rx+ | GND | USB ID | GND |
| Factory Mode (USB ID = V_BAT) | V_BAT | USB DM | USB DP | USB3.0 Tx- | USB3.0 Tx+ | V_BAT | USB3.0 Rx- | USB3.0 Rx+ | GND | V_BAT | GND |

METHOD AND APPARATUS FOR CONTROLLING A CONNECTION INTERFACE

CLAIM OF PRIORITY

This application claims priority from and the benefit under 35 U.S.C. § 119(a) of Korean Patent Application No. 10-2013-0078218, filed on Jul. 4, 2013, which is hereby incorporated by reference for all purposes as if fully set forth herein.

BACKGROUND

1. Field of the Invention

The present disclosure relates generally to connection interfaces, and more particularly, to a method and apparatus for controlling a connection interface.

2. Description of the Prior Art

Universal Serial Bus (USB) is an industry standard developed in the mid-1990s that defines the cables, connectors and communications protocols used in a bus for connection, communication, and power supply between computers and electronic devices. USB 3.0 supports a transmission speed of 5 Gbps, which is 10 times faster in maximum transmission speed than in the USB 2.0 standard, and also significantly reduces power consumption. USB 3.0 uses a connector structure that is compatible with the USB 2.0 standard.

FIG. 1 is a diagram of conventional USB connector that includes a USB 2,O-compatible part 10 and a part 20 extended to the exclusive use of USB 3.0. The conventional USB connector includes the USB 2.0-compatible part 10 and the part 20 extended for the exclusive use of USB 3.0 in order to maintain compatibility between the USB 3.0 standard and the USB 2.0 standard. However, a disadvantage of this solution is that it results in the connector having an increased size. Moreover, when the USB connector is disposed in the center of a lower end of the portable terminal according to the recent design trend, right and left asymmetry degrades stability and beauty in terms of design. Accordingly, the need exists for an improved connector design.

SUMMARY

The present disclosure addresses this need. According to one aspect of the disclosure, an electronic device is provided comprising a processor; a connection unit including a power supply terminal and an identification terminal; a first switch coupled to the power supply terminal and the processor; a second switch coupled to the identification terminal and the processor; and an interface control circuit configured to control an amount of current supplied to the processor by opening or closing each of the first switch and the second switch in accordance with voltage that is applied to at least one of the power supply terminal and the identification terminal by an external device connected to the connection unit.

According to another aspect of the disclosure, an interface is provided comprising: a connection unit including an identification terminal and a power supply terminal; a first switch coupled to the power supply terminal and a processor, a second switch coupled to the identification terminal and the processor; and an interface control circuit configured to: recognize a mode which the processor is required to enter based on a voltage measured at the identification terminal, provide to the processor an indication of the mode which the processor is required to enter, and when the processor is required to enter a factory mode, cause only one of the first switch and the second switch to supply the processor with power; wherein when the processor is in the factory mode, the processor performs at least one test of a component of an electronic device.

BRIEF DESCRIPTION OF THE DRAWINGS

The above and other objects, features and advantages of the present disclosure will be more apparent from the following detailed description in conjunction with the accompanying drawings, in which:

FIG. 1 is a diagram of a USB connector that is known in the prior art;

FIG. 3 is table illustrating an example of assignments of different terminals in the connector of FIG. 2A and FIG. 2B;

FIG. 9 is a table illustrating an example of a map of 11 terminals of a connector for the exclusive use of USB 3.0, which accepts a High-Definition Multimedia Interface (HDMI) converter according to aspects of the disclosure;

DETAILED DESCRIPTION

Figure 2A:
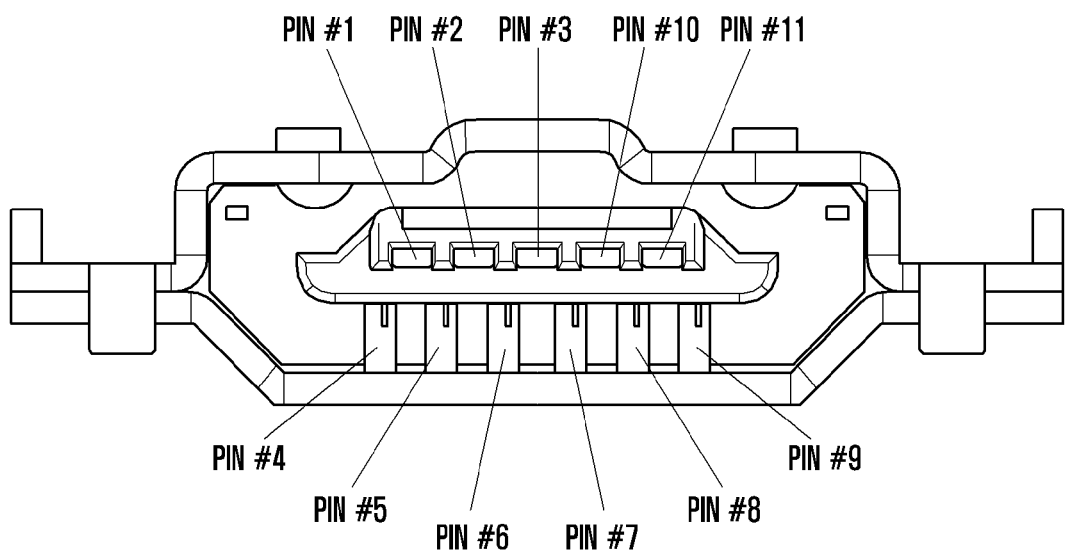
FIG. 2A and FIG. 2B are diagrams depicting a cross-sectional view and a front view of an example of a USB connector according to aspects of the present disclosure.

Hereinafter, aspects of the disclosure will be described in detail with reference to accompanying drawings. A detailed description of well-known functions and configurations will be omitted so as not to obscure subject matter that is considered more pertinent. Similarly, in the accompanying drawings, some elements may be omitted, not drawn up to scale, or schematically illustrated. Accordingly, the disclosure is not limited to relative sizes or distances shown in the drawings.

Figure 2B:
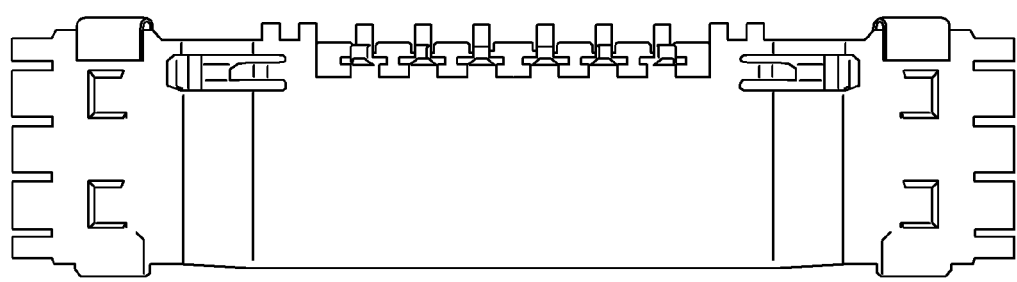

Referring to FIGS. 2A and 2B, a cross-sectional view and a front view, are depicted of an example of a USB connector, according to aspects of the disclosure. The connector may be compatible with both the USB 2.0 and the USB 3.0 standards. As illustrated, the connector may include 11 terminals supporting not only USB 2.0 and USB 3.0 but also the Mobile High-Definition Link (MHL) standard. A map of the connector's terminals is provided in FIG. 3. As illustrated, the terminals comport to both the USB 3.0 and USB 2.0 standards.

According to aspects of the disclosure, the connector may be utilized to switch an electronic device incorporating the connector between a user mode and a factory mode. For example, the electronic device may measure the voltage applied to an identification terminal USB_ID (which is terminal 10 of the connector in this example), and based on the voltage may recognize that the electronic device is required to enter one of the user mode or the factory mode. Specifically, when it is detected that the voltage applied to the identification terminal USB_ID is equal to or greater than a factory voltage value V_BAT_THRESHOLD, the electronic device may enter the factory mode. When the voltage of the identification terminal USB_ID is less than the value V_BAT_THRESHOLD, the electronic device may enter the user mode.

In the user mode of the electronic device, the type of an accessory connected to the USB port may be detected through the identification terminal USB_ID. In addition, terminals 6 to 8 may be appropriately switched according to the accessory detected through terminal 10 by a USB interface control circuit 800. This switching operation will be described in detail below with reference to FIG. 4 to FIG. 8.

In the factory mode of the electronic device, appropriate switching between terminals of the USB connector and internal circuits may be implemented according to the progress status of a process by the USB interface control circuit 800.

Figure 4:
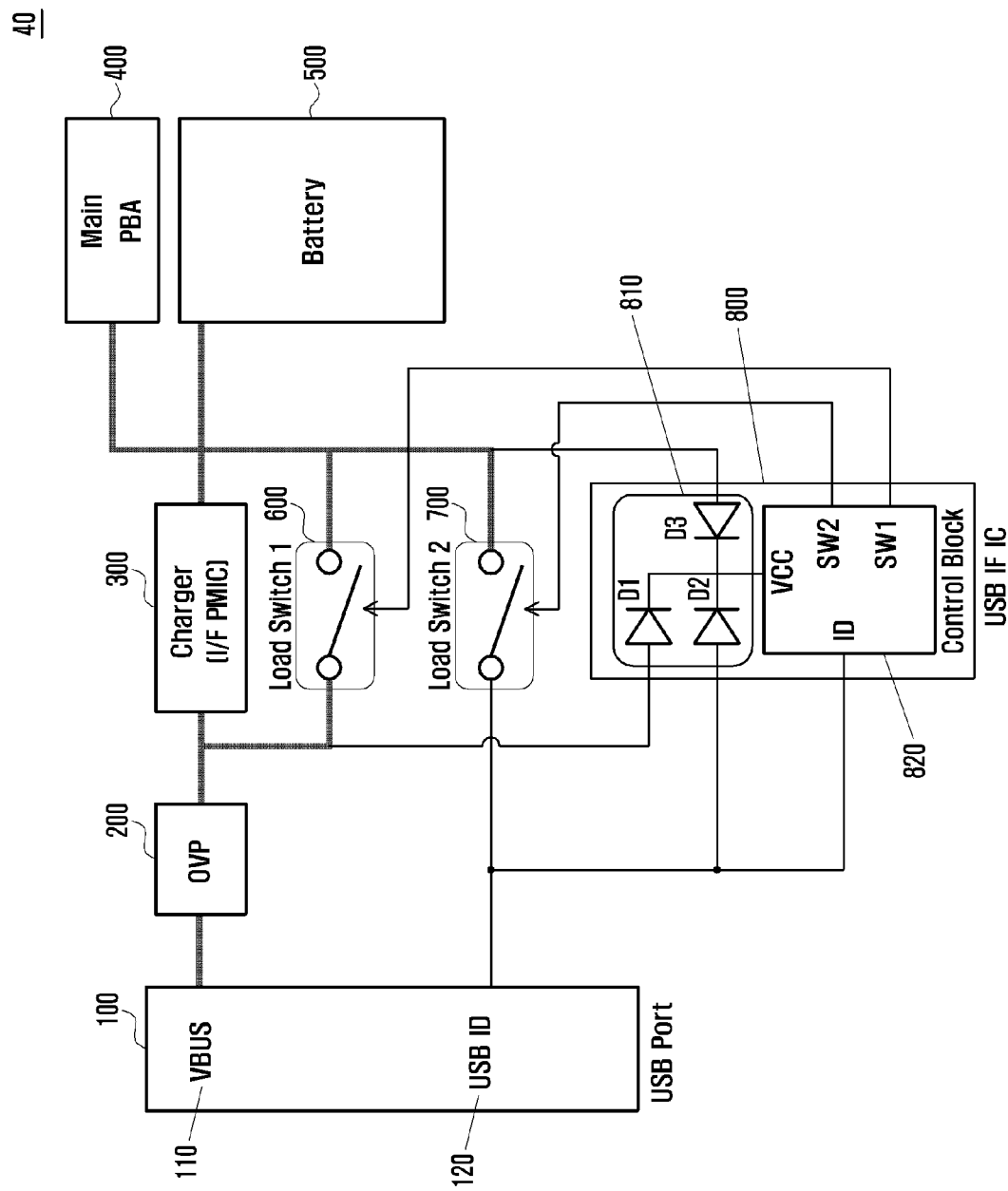
FIG. 4 is a block diagram of an example of an electronic device according to aspects of the present disclosure.

FIG. 4 is a block diagram of an example of an electronic device 40 according to aspects of the present disclosure. The electronic device may include a smartphone, a tablet, a laptop, and/or any other suitable type of electronic device. As illustrated, the electronic device 40 may include a connection unit 100, an Overvoltage Protection (OVP) unit 200, a charging circuit 300, the application processor 400, a battery 500, a first switch 600, a second switch 700, and the USB interface control circuit 800.

The connection unit 100 may include a power supply terminal 110 (also referred to as "VBUS terminal") for supplying power, an identification terminal 120 (also referred to as "USB_ID terminal") for identifying an external device, and the like. The connection unit 100 includes a total of 11 terminals, including the power supply terminal 110 and the identification terminal 120. However, FIG. 4-9, for illustrative purposes, each depict only the power supply terminal 110 and the identification terminal 120 of the connection unit 100.

The electronic device 40 may be supplied with power from an external power supply unit through the connection unit 100. Specifically, the electronic device 40 may be supplied with power through at least one of the power supply terminal 110 and the identification terminal 120. The OVP unit 200 is disposed between the power supply terminal 110 and the charging circuit 300. When a voltage provided through the power supply terminal 110 is greater than or equal to a previously-defined predetermined voltage, the OVP unit 200 blocks the voltage, and may thereby protect elements, such as the charging circuit 300, the battery 500 and the application processor 400 which are connected to the charging circuit 300.

The charging circuit 300 receives power provided from the power supply terminal 110 through the OVP unit 200. Then, the charging circuit 300 may charge the battery 500 by using the provided power.

The processor 400 may include an ARM-based processor, an x86-based processor, and/or any other suitable type of processor.

The USB interface control circuit 800 may be supplied with power via the connection unit 100 or by the battery 500. The USB interface control circuit 800 may be implemented by an Integrated Circuit (IC) chip. The USB interface control circuit 800 may be operated by the largest voltage from among a voltage applied through a first diode D1 connected to the power supply terminal 110, a voltage applied through a second diode D2 connected to the identification terminal 120, and a voltage applied through a third diode D3 connected to the battery 500. As illustrated in FIG. 4, the USB interface control circuit 800 is capable of being powered by any one of the power supply terminal 110, the identification terminal 120 and the battery 500.

Also, the USB interface control circuit 800 may further include switches 600 and 700 which adjust power flow from the connection unit 100 to the application processor 400 according to whether the electronic device 40 is desired to enter the user mode and the factory mode. The switch 600 may be disposed between the power supply terminal 110 and the application processor 400. The switch 700 may be disposed between the identification terminal 120 of the connection unit 100 and the application processor 400.

The USB interface control circuit 800 may recognize whether the electronic device 40 is desired to enter the user mode or the factory mode according to states of one or more terminals of the connection unit 100. Specifically, the USB interface control circuit 800 may recognize a mode of the electronic device 40 as the user mode, when detection is made of a state in which external power VBUS supplied through the power supply terminal 110 passes through the charging circuit 300 and charges the battery 500, or a state in which an external charging device (e.g., a Travel Adapter (TA)) or an accessory is connected to the identification terminal 120.

According to aspects of the disclosure, the USB interface control circuit 800 allows a constant current $I_{ID}$ to flow through the identification terminal 120, and thereby measures a resistance value by using a voltage generated at the identification terminal 120. The USB interface control circuit 800 detects the type of accessory mapped to the measured resistance value by using a mapping table obtained by mapping the type of accessory to a pre-stored resistance value. The USB interface control circuit 800 then provides an indication of the detected type of accessory to the application processor 400, and may operate the electronic device 40 in a type of user mode that corresponds the connected accessory.

In some aspects, when recognizing that a process voltage V_BAT is applied to the power supply terminal 110 and the identification terminal 120 in a state in which the battery 500 is not present, the USB interface control circuit 800 may recognize a mode of the electronic device 40 as the factory mode.

According to aspects of the disclosure, when a connection of a process cable to the identification terminal 120 of the connection unit 100 is detected, the USB interface control circuit 800 recognizes the state as a first factory mode when the process voltage (V_BAT) is applied to the power supply terminal 110 and as a second factory mode when applied to the identification terminal 120.

In the present example, when a process cable 1000 is connected to the identification terminal 120 and the process voltage V_BAT is applied to the power supply terminal 110, the USB interface control circuit 800, which recognizes this state as a first factory mode, closes the first switch 600. The first switch 600, when closed, connects the power supply terminal 110 to the application processor 400, and enables the process voltage V_BAT to be applied to the application processor 400. When the process cable 1000 is connected to the identification terminal 120 of the process voltage V_BAT is applied to the identification terminal 120, the USB interface control circuit 800, which recognizes this state as a second factory mode, closes the second switch 700. The second switch 700, when closed, connects the identification terminal 120 to the application processor 400, and enables the process voltage V_BAT to be applied to the application processor 400.

When the application processor 400 is supplied with the process voltage V_BAT applied to the identification terminal 120 by closing the second switch 700 as described above, the application processor 400 may perform various tests on various functions and/or components of the electronic device 40. The performance of these tests requires a smaller amount of current to drive the application processor that it would be needed if the processor was mainly used for multitasking. Because performing the tests requires a comparatively small amount of current, no problem arises in the application processor 400 is powered through the identification terminal. However, in instances in which there is no difficulty in supplying the application processor 400 with the amount of current through only the identification terminal 120 in the second factory mode, the configuration of the first switch 600 may be omitted.

Figure 5:
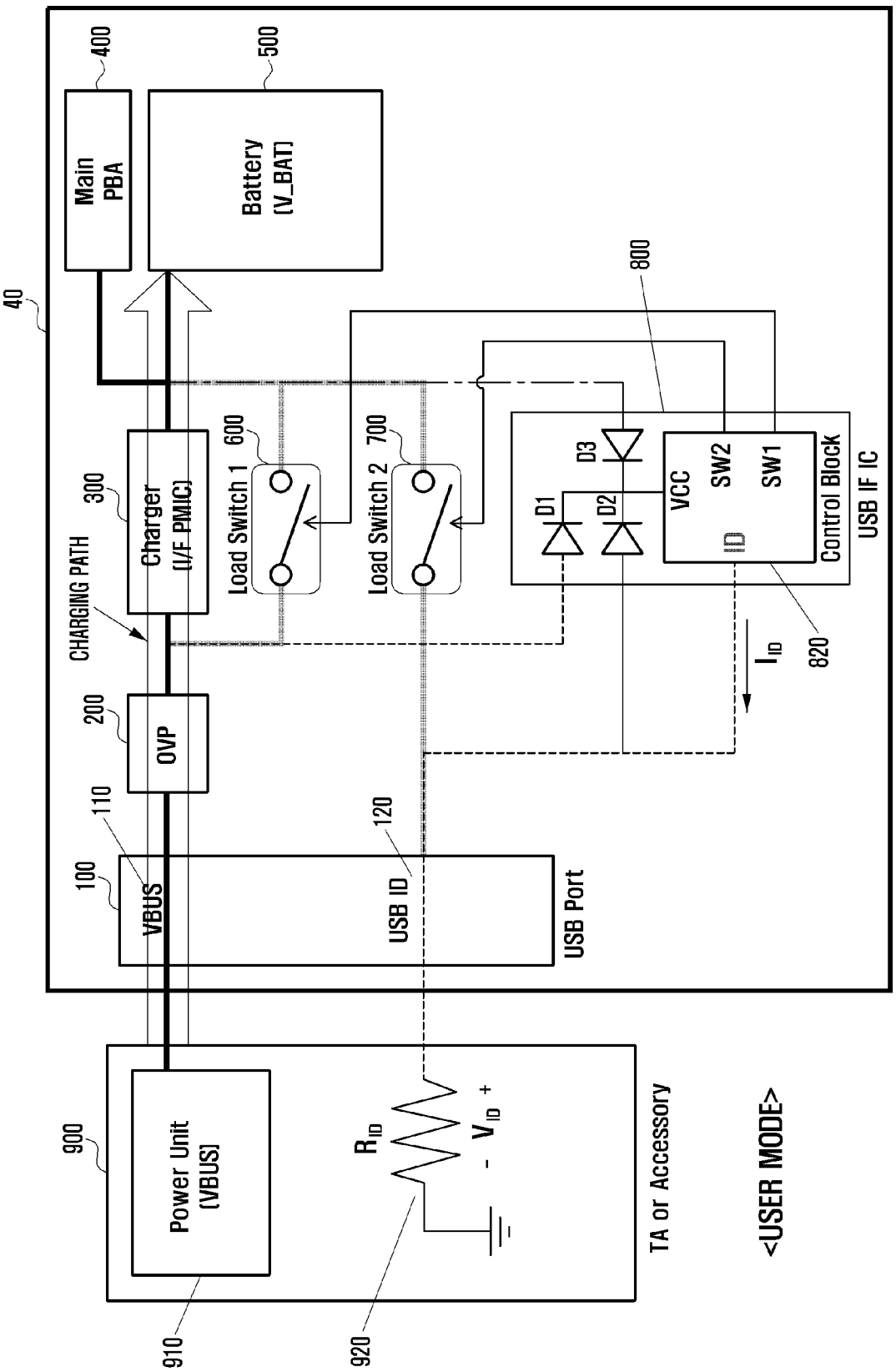
FIG. 5 is a block diagram illustrating an example of the operation of the electronic device of FIG. 4 when the electronic device is in a user mode, according to aspects of the disclosure.

FIG. 5 is a block diagram illustrating an example of the operation of the electronic device 40 when the electronic device is in a user mode, according to aspects of the disclosure. In this example, the electronic device is coupled to an external charging device via the connection unit 100. When the electronic device 40 is in the user mode, various elements including the USB interface control circuit 800 may be supplied with power from the battery 500 or an external charging device. As illustrated, the battery 500 may be charged by an external charging device 900 coupled to the electronic device 40 via the connection unit 100. Also, when the external charging device is disconnected from the connection unit 100, the battery 500 is used to power the control circuit 800.

In some aspects, the external charging device 900 (or an accessory) may be connected to the identification terminal 120 of the connection unit 100. For example, when detection is made of a state in which the battery 500 is charged by power VBUS supplied from the power supply terminal 110 through the charging circuit 300, or when detection is made of a state of connecting the external charging device or an accessory to the identification terminal 120, the USB interface control circuit 800 may recognize that the electronic device 40 is operating in the user mode.

In some aspects, the USB interface control circuit 800 operates by power supplied from the battery 500 or a charger, and accordingly, allows a constant current $I_{ID}$ to flow through the identification terminal 120. When a TA or an accessory is connected to the identification terminal 120, a voltage drop occurs at the identification terminal 120. The application processor 400 senses a voltage $V_{ID}$ across the resistor $R_{ID}$ of the identification terminal 120, and measures a resistance value. Then, the application processor 400 detects the type of accessory mapped to the measured resistance value by using a mapping table that maps the type of accessory to a respective resistance value.

Put differently, in some aspects, a constant current circuit is configured within the USB interface control circuit 800 that is coupled to the terminal 120 of the connection unit 100. When a constant current flows through a resistor of the accessory connected to the identification terminal 120, a voltage proportional to the resistor of the accessory is generated across the resistor. The application processor 400 measures the generated voltage, and detects a resistance value of the resistor. Based on the resistance value, the application processor 400 identifies the accessory (or charging device) that is connected to the connection unit 100. The identification may be performed based on a table that relates device identifiers to respective resistance values.

In the present example, the constant current circuit is also driven by a constant voltage source applied to the USB interface control circuit 800, and thus a voltage of the USB interface control circuit 800 cannot be greater than that of the constant voltage source. Also, a maximum voltage applied to the identification terminal 120 may be limited by limiting the amount of a maximum constant current. In an aspect of the present disclosure, the limited value of the maximum voltage may be set to be less than a minimum value of a typical battery voltage, or may be set to be less than a lower limit value of a process voltage V_BAT.

Meanwhile, in an embodiment of the present disclosure, a method of using a constant current source to detect a resistance value of the connected accessory is described as an example. In some implementations alternative techniques may be employed for detecting the resistance values of the connected accessories, such as techniques that are based on, leakage current, techniques that use a voltage divider, etc.

Figure 6:
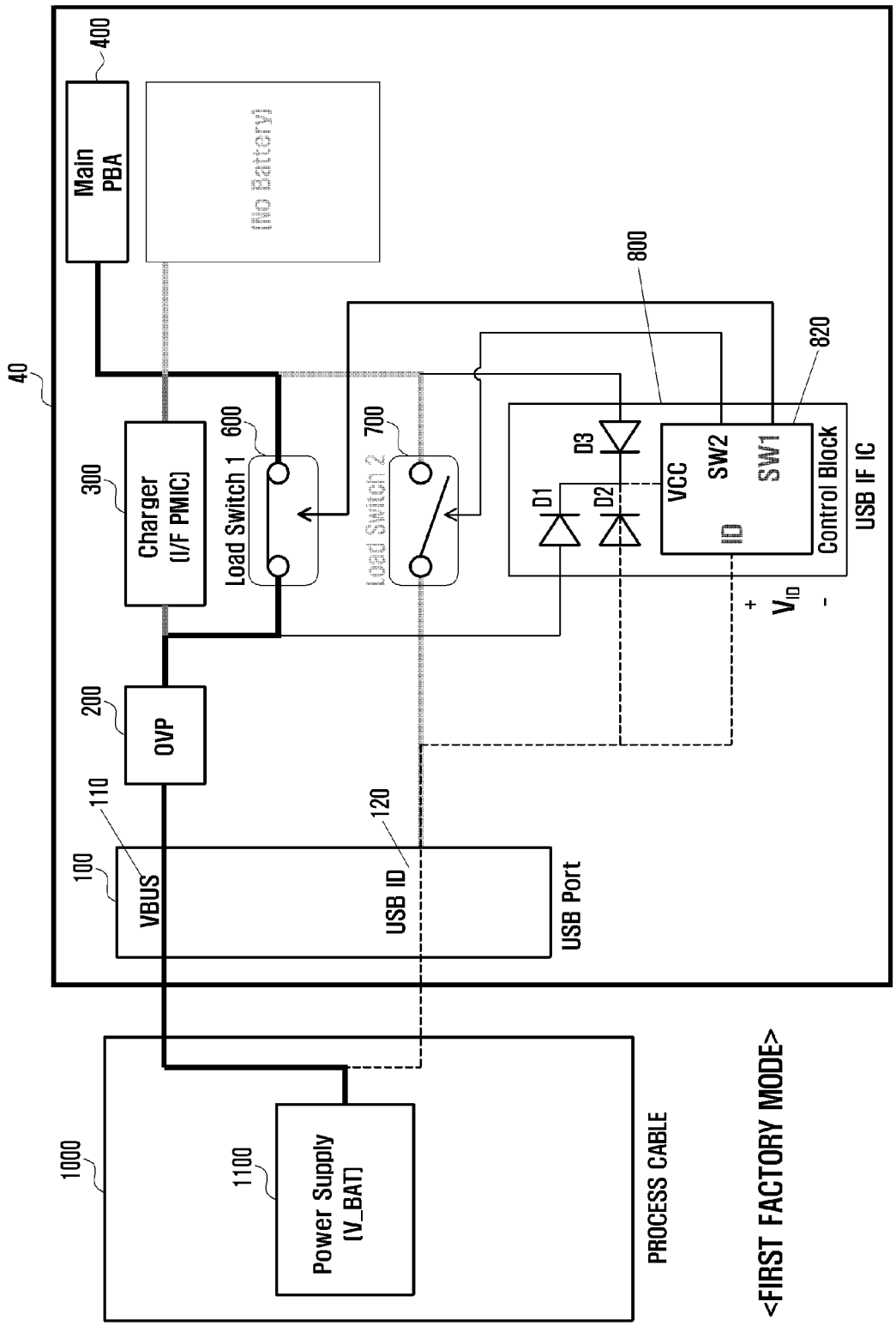
FIG. 6 is a block diagram illustrating an example of the operation of the electronic device of FIG. 4 when the electronic device is in a first example of a factory mode.

FIG. 6 is a block diagram illustrating an example of the operation of the electronic device 40 when the electronic device is in a first example of the factory mode. In this example, the electronic device is coupled to a process cable 1000.

The process cable can be configured to apply a preset process voltage (V_BAT) to the power supply terminal 110 or to the identification terminal 120. The process cable can be used for executing a process program by having the electronic device enter a factory mode.

Unlike the user mode, the first factory mode can test the electronic device based on each function and execute the process program consuming less power than a program executed on the user mode. The second factory mode is characterized by a low power consumption of the application processor and a test of a charging circuit 300 by using a charger voltage.

In this example, the electronic device 40 lacks battery. A process voltage V_BAT is applied to the USB interface control circuit 800 via the identification terminal 120 through the process cable 1000. The USB interface control circuit 800, measures the applied process voltage V_BAT. When the applied process voltage V_BAT meets a predetermined voltage threshold V_BAT_THRESHOLD (e.g., when the process voltage is greater than or equal to the threshold), the USB interface control circuit 800 recognizes that the electronic device is desired to enter in the factory mode. Then, the USB interface control circuit 800 closes the first switch 600, causing the current to be supplied from the power supply terminal 110 directly to the application processor 400.

In some aspects, the process voltage may be supplied via a process cable that is plugged into the connection unit 100. In this example, the process cable 1000 is configured to apply the process voltage V_BAT to the power supply terminal 110, thereby causing the processor 400 to be booted. When the application processor 400 is booted, the application processor 400 recognizes that a mode of the electronic device 40 is the factory mode, by communicating with the USB interface control circuit 800. Responsive to detected that the application processor (or electronic device 40) is required to enter into the factory mode, the booted application processor 400 may perform a process program. The process program can comprise programs able to test the function of each component of the electronic device.

Figure 7:
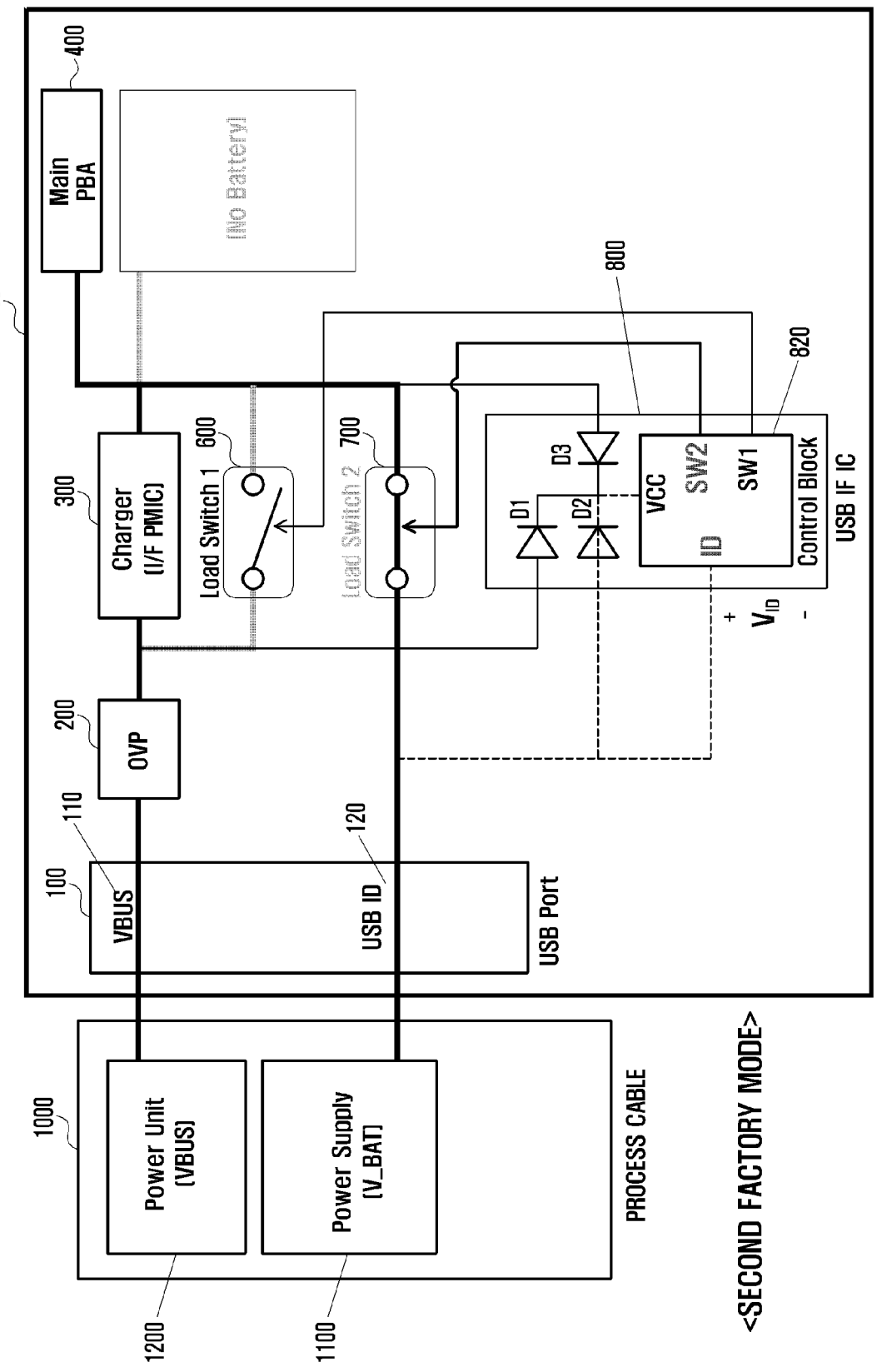
FIG. 7 is a block diagram illustrating an example of the operation of the electronic device of FIG. 4 when the electronic device in a second example of the factory mode, according to aspects of the disclosure.

Meanwhile, although not illustrated in FIG. 6, the connection unit 100 may include additional terminals for supplying additional power to the application processor. The additional power may be need in order for the application processor 400 to be able to operate in the user mode. In the user mode, application processor may perform functions such as multimedia playback and multitasking which are more power intensive. By contrast, in the factory mode, of the application processor performs one or more tests of different capabilities of the electronic device 40. Accordingly, the application processor, when operating in the factory mode, needs less power than what is required for the processor to operate in the user mode FIG. 7 is a block diagram of an example of an electronic device 40 in a second example of the factory mode, according to aspects of the disclosure. The second factory mode is characterized by a low power consumption of the application processor.

In this example a voltage V_BAT is applied to the USB control circuit 800. Based on the magnitude of the V_BAT being above a threshold (or being within a predefined range) the USB interface control circuit 800 closes the second switch 700 while maintaining the first switch 600 in an open state. When the second switch 700 is closed, the process voltage V_BAT, is applied to the application processor 400 via the identification terminal. In some aspects, the USB interface control circuit 800 (which is powered with current received via the identification terminal 120) may recognize based on the voltage V_Bat being within range (or satisfying a threshold) that the electronic device 40 is required to enter into factory mode and accordingly may provide an indication to this effect to the application processor 400. Notably, in the example of FIG. 7, the power supply terminal 110 is not used to supply power to the application processor 400. Accordingly, by applying a charger voltage VBUS to the power supply terminal 110, the power supply terminal 110 may be used to test whether the charging circuit 300 operates normally. Thus, the electronic device 40 may be placed in the second factory mode when the application processor needs a smaller amount of power to operate than otherwise and/or when the charging circuit needs to be tested.

Figure 8:
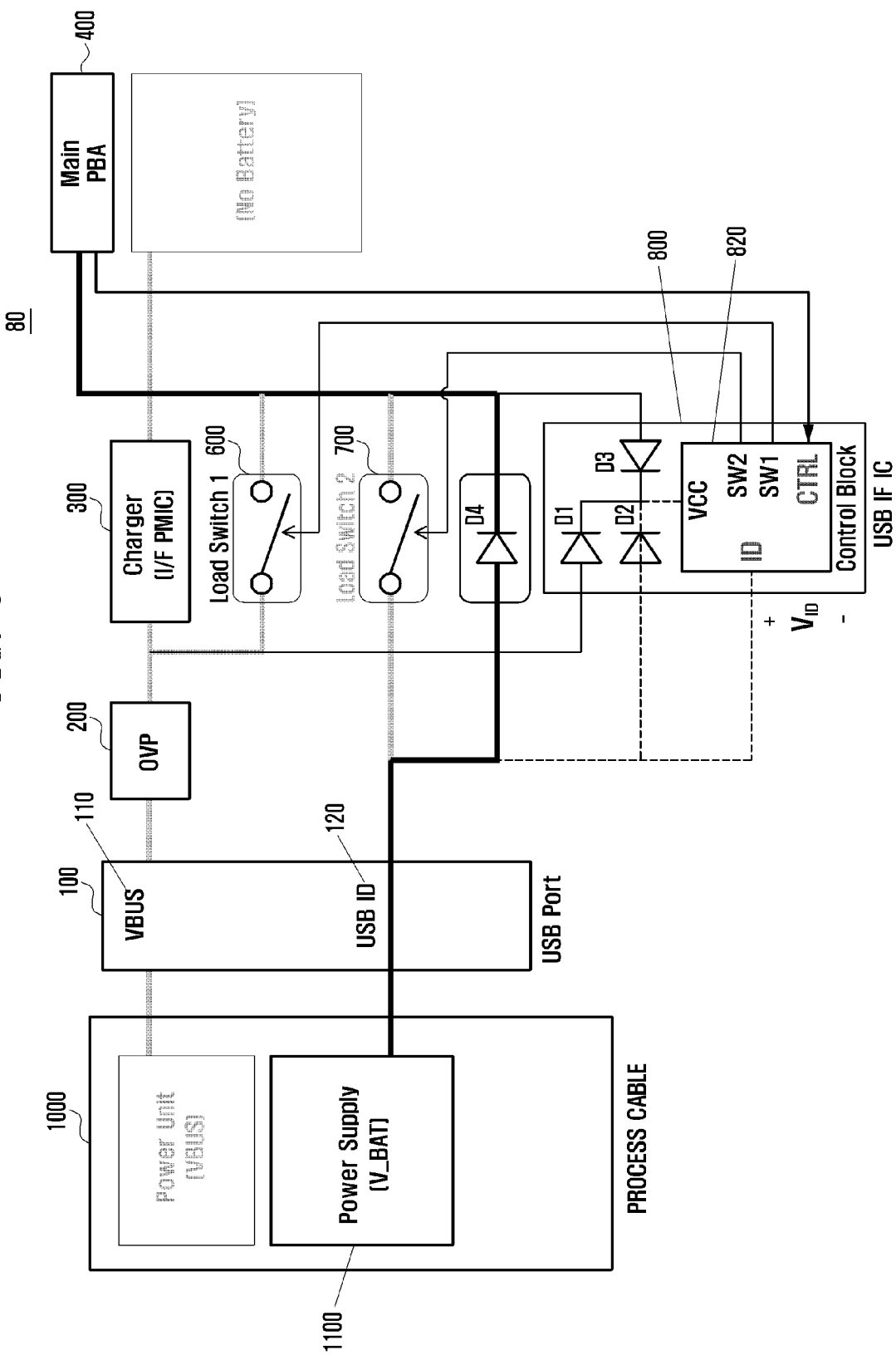
FIG. 8 is a block diagram of yet another aspect of an electronic device, according to aspects of the disclosure.

FIG. 8 is a block diagram of an example of an electronic device 80, according to aspects of the disclosure. In some aspects, one difference between the electronic device 40 and the electronic device 80 may be that in the electronic device 80 the processor 400 controls the USB interface control circuit 800 to close/open the switches 600 and 700, whereas in the electronic device 40 the closing and opening of the switches 600 and 700 may be performed independently from the processor 400 by the interface control circuit 800.

In this example, the electronic device 80 further includes a power diode D4 through which a forward current flows from the identification terminal 120 to the application processor 400. When a process voltage V_BAT is applied to the identification terminal 120, the power diode D4 is forward connected from the identification terminal 120 to the application processor 400, and thus may supply a current to the application processor 400. The application processor 400 is booted by the current supplied as described above, and the booted application processor 400 recognizes that the electronic device 40 is in the factory mode by communicating with the USB interface control circuit 800 (e.g., by receiving an indication to that effect from the interface control circuit 800). Afterwards, the processor 400 may cause the USB interface control circuit 800, to close or open the first switch 600 and/or the second switch 700 as necessary.

Meanwhile, when the application processor 400 is supplied with power through the power diode D4, due to a voltage drop occurring at the power diode D4, the application processor 400 is supplied with a voltage reduced by the voltage drop. In the present example, attention is needed in that it is possible to perform normal booting when a default value of the process voltage V_BAT needs to be set so as to allow this voltage to be greater than a minimum voltage of the battery 500.

FIG. 9 is a table illustrating an example of a map of eleven terminals of a connector for the exclusive use of USB 3.0, which accepts a High-Definition Multimedia Interface (HDMI) converter according to an aspect of the present disclosure. MHL (also referred to as a "High Definition Television (HDTV) adaptor") is a new standard which defines a connection between a mobile device and a TV, which follows the HDMI which is an HD image interface standard between a TV and a Personal Computer (PC). The MHL is a technical standard which enables streaming of media content from portable devices to a TV, a monitor, or the like. However, typically, in order to output data of a smart phone to an external display (e.g., a TV, a monitor, or the like) through the MHL, signals formatted according to the MHL protocol need to be converted to the HDMI protocol. This conversion enables a connection of the USB interface of the smart phone to an interface of the external display.

Referring to a map of 11 terminals of the USB 2.0 connector having the existing structure illustrated in FIG. 3, terminals 6 to 8 are assigned to a role for MHL communication (for example, using MHL DM, MHL DP, MHL ID). Also, referring to a map of 11 terminals of the USB 3.0-compatible connector which is an improved idea illustrated in FIG. 3, terminals 6 to 8 are assigned to a role for MHL communication (for example, using MHL DM, MHL DP, MHL ID) together with a role for transmitting and receiving data during data communication (for example, using USB RX+, USB TX−, USB TX+).

In order to simply implement a complex terminal map of the USB connector as described above, the present disclosure proposes a map of eleven terminals of the connector for the exclusive use of USB 3.0 as illustrated in FIG. 9.

Specifically, in an aspect of the present disclosure, as illustrated in the map of the eleven terminals of the connector for the exclusive use of USB 3.0 as illustrated in FIG. 9, a USB interface is implemented so as to meet the exclusive use of USB 3.0, and thereby terminal assignment for the MHL in a USB connector may be omitted. The converter which converts USB 3.0 into HDMI is connected to the outside, and thereby an HDMI signal may be transmitted to the external display device.

The USB 3.0 interface has a bandwidth of 5 Gbps, and thus is capable of sufficiently transmitting MHL data having a maximum of 3 Gbps. Accordingly, the transmission of an HDMI-level image to the external display can be easily solved by a method of connecting the USB 3.0-to-HDMI converter to the connector.

In other words, the USB 3.0 interface has a higher data transmission rate than that in the case of using the USB 2.0 interface, and thus may omit MHL.

Meanwhile, in order to improve a cross talk problem of a Tx terminal and an Rx terminal for transmitting and receiving data, the USB 3.0-compatible connector illustrated in FIG. 9 has the Tx terminal and the Rx terminal which may be spaced from each other by one terminal distance. As described above, the USB connector according to an aspect of the present disclosure has terminal arrangement which enable a terminal to be physically spaced from another by a predetermined distance in order to prevent a problem such that a signal of another channel is leaked to one signal system when signals are transmitted through two or more channels.

Figure 10:
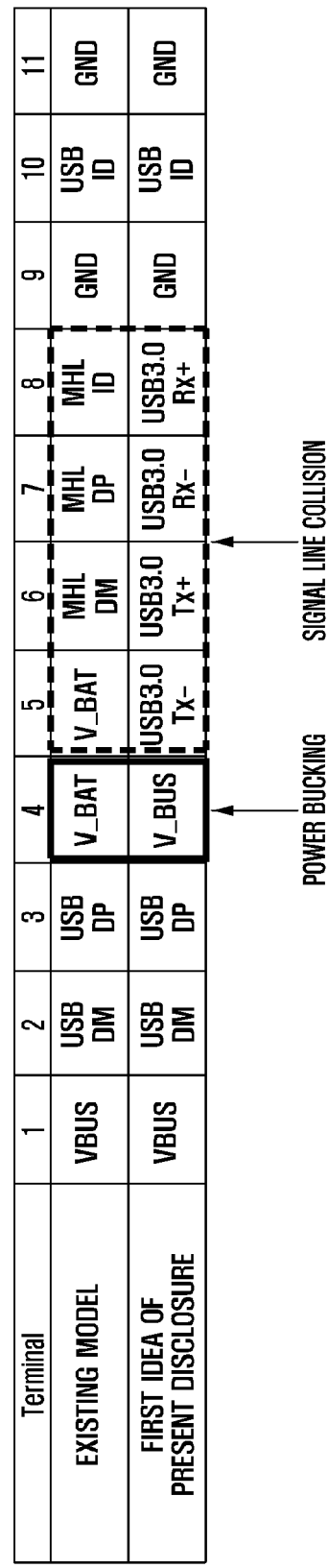
FIG. 10 is table illustrating an example of map of terminals in a USB 2.0 connector, according to aspects of the disclosure.

On the other hand, it is feared that a cable matched to the connector for the exclusive use of USB 3.0, which accepts the HDMI converter disclosed with reference to FIG. 9, for example, may be connected to the existing USB 2.0 connector illustrated in FIG. 10. In this case, problems may arise in as a result of power bucking at terminal 4 and signal lines colliding with each other at terminals 5 to 8.

Figure 11:
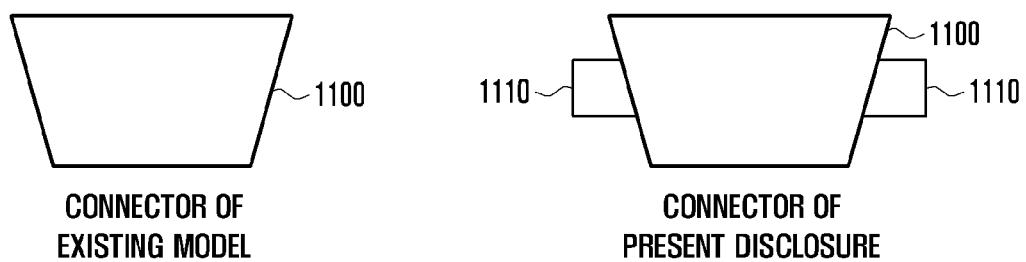
FIG. 11 is a diagram illustrating an example of a connector, according to aspects of the disclosure.

In order to solve these problems, the connector for the exclusive use of USB 3.0, which accepts the HDMI converter, according to an aspect of the present disclosure may include a protrusion 1110 added to an insertion structure 1100 as illustrated in FIG. 11, and may be configured such that the connector for the exclusive use of USB 3.0 cannot be inserted into another model, such as the existing USB 2.0 connector.

Figure 12:
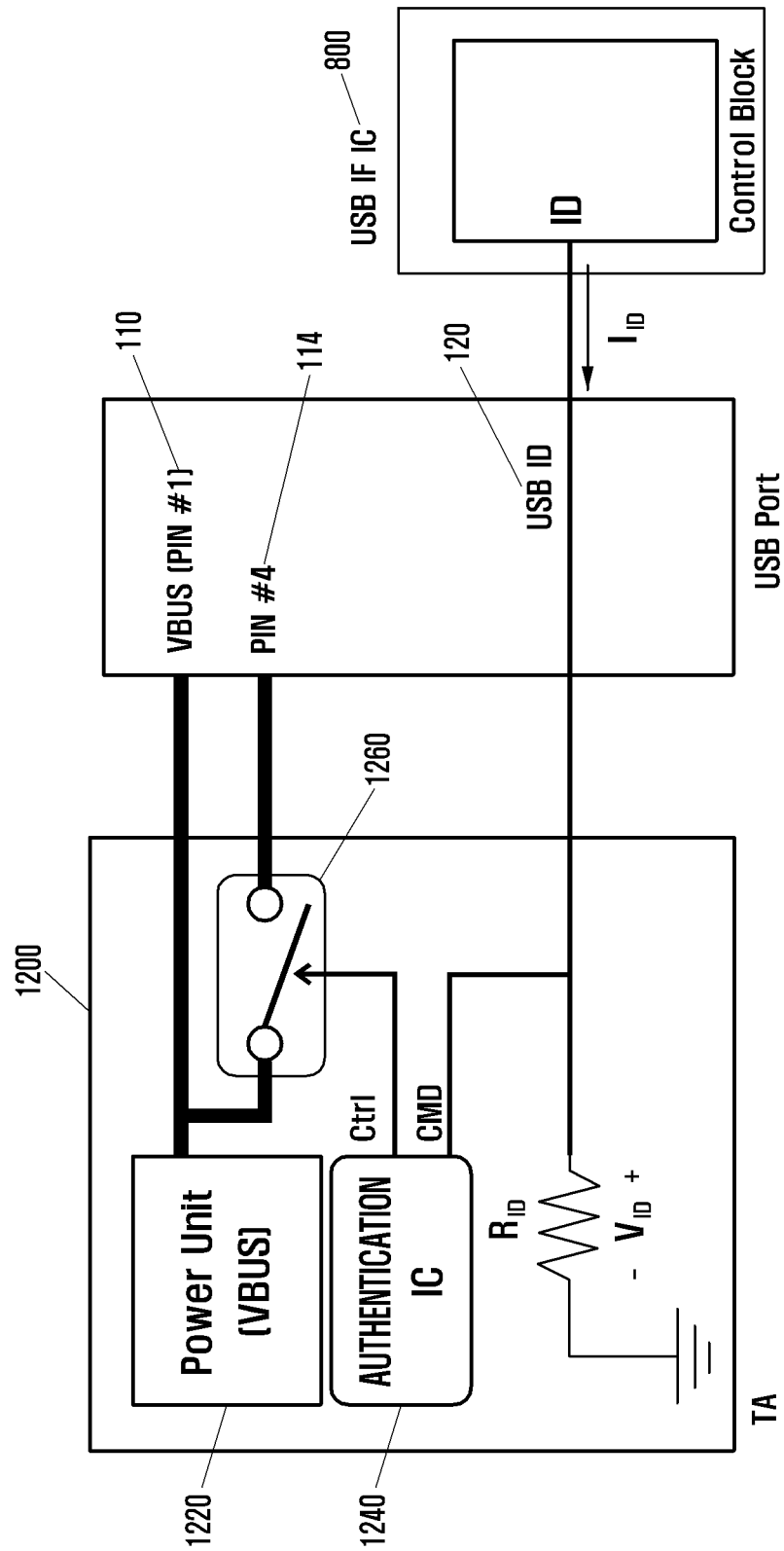
FIG. 12 is a block diagram of an example of a charging system, according to aspects of the disclosure.
Figure 13:
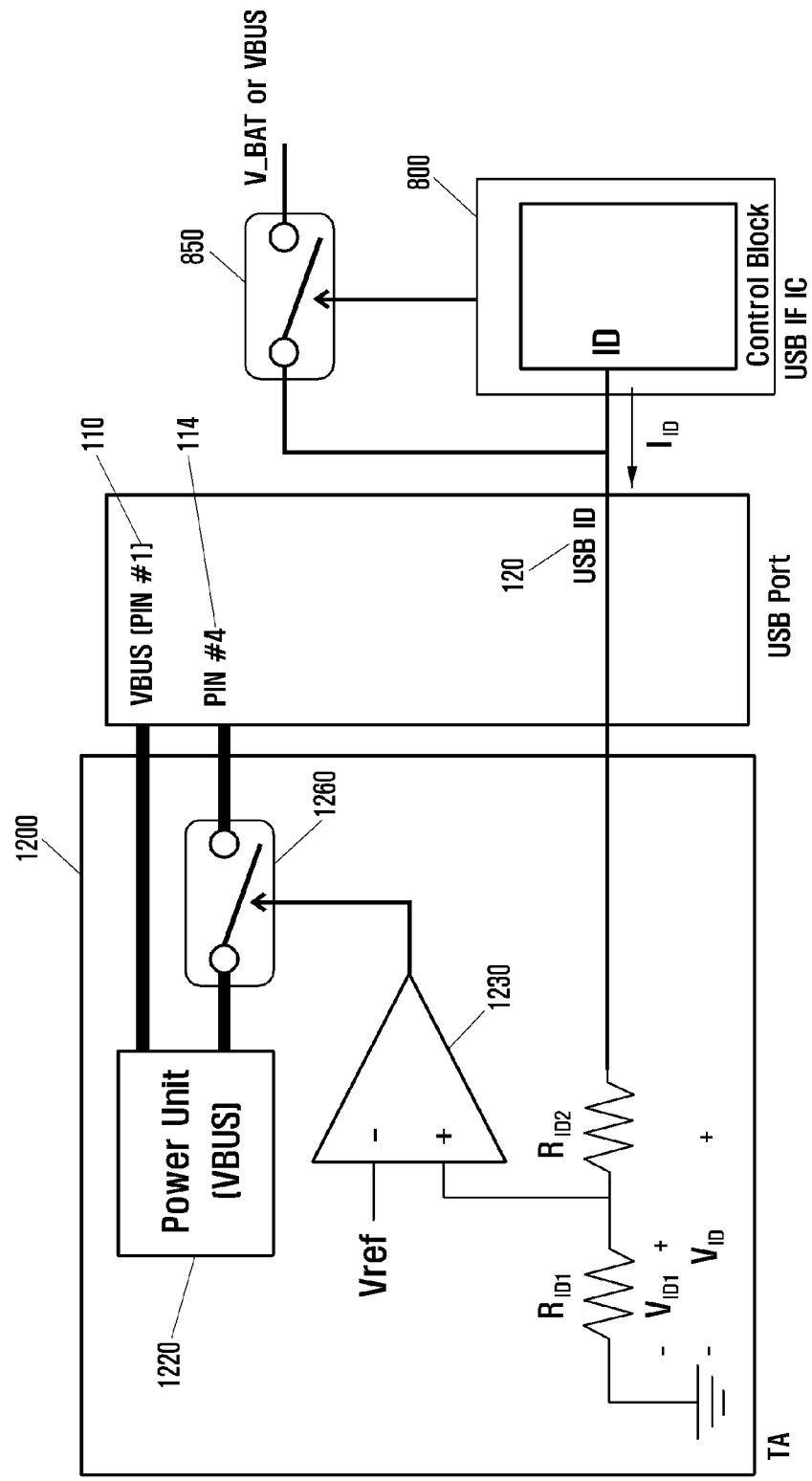
FIG. 13 is a block diagram of another example of a charging system, according to aspects of the disclosure.

FIG. 12 and FIG. 13 are block diagrams each schematically illustrating an example of a high-speed/high-capacity charging system using a USB connector according to another aspect of the present disclosure.

For reference, basic configurations and roles of a terminal #1 110, a terminal #4 114 and the identification terminal 120 of the connection unit 100, and the USB interface control circuit 800, which are illustrated in each of FIG. 12 and FIG. 13, are identical to those of the elements denoted by identical reference numerals, which have been described with reference to FIG. 2A to FIG. 8. Accordingly, a detailed description thereof will be omitted. Also, although terminal #1 and terminal #4 are disclosed as terminals matched to the power supply terminal, this configuration is only an example. Accordingly, terminals denoted by different reference numerals may be employed.

Referring to FIG. 12, an external charging device 1200 according to another aspect of the present disclosure is implemented so as to charge the battery of the electronic device. The external charging device 1200 includes a switch 1260 at a power supply terminal in order to selectively support high-speed/high-capacity charging.

The USB interface control circuit 800 first recognizes that an accessory connected to the connection unit 100 is the external charging device 1200, through the identification terminal 120. To this end, the USB interface control circuit 800 allows a constant current $I_{ID}$ to flow through the identification terminal 120, and measures a resistance value $R_{ID}$ by using a voltage $V_{ID}$ generated at the identification terminal 120. Then, the USB interface control circuit 800 detects the measured resistance value $R_{ID}$ and the type of accessory mapped to the measured resistance value $R_{ID}$ by using a mapping table. Accordingly, the USB interface control circuit 800 may recognize that the external charging device 1200 is connected to the identification terminal 120.

After the USB interface control circuit 800 first recognizes the type of an accessory connected to the connection unit 100, the identification terminal 120 may support communication with the external device connected to the connection unit 100. Specifically, after the USB interface control circuit 800 recognizes the external charging device 1200 connected to the connection unit 100 as described above, the identification terminal 120 may be used to transmit/receive data to/from an authentication IC 1240 by using a 1-wire communication technique.

The external charging device 1200 includes the authentication IC 1240 capable of communicating data with the USB interface control circuit 800 through the above-described identification terminal 120. Specifically, when receiving a state information request from the USB interface control circuit 800, the authentication IC 1240 may transmit information on the external charging device 1200, information on a connection state of the external charging device 1200, and the like, to the USB interface control circuit 800. For example, the authentication IC 1240 may transmit to the USB interface control circuit 800 an indication that the external charging device 1200 is a charging device for high-speed/high-capacity charging. Alternatively, the authentication IC 1240 may transmit an indication of connection state of a power supply line of the external charging device 1200, to the terminal #1 110 and the terminal #4 114 of the connection unit 100.

A typical charging device supplies power through one of terminals of a USB connector. However, the external charging device 1200, according to another aspect of the present disclosure, may supply power through multiple terminals from among terminals of the USB connector. As illustrated in FIG. 12, the connection unit 100 of the USB connector may support the terminal #1 110 and the terminal #4 114 thereof for high-speed/high-capacity charging. Here, the terminal #1 110 may be a default terminal for supplying external power, and the terminal #4 114 may be an additional terminal for high-speed/high-capacity charging. The additional terminal 114 may be selectively connected to a power unit 1220 through the switch 1260.

When receiving a high-voltage charging request, a request for increasing the number of terminals of a power supply terminal VBUS, or the like from the USB interface control circuit 800, the authentication IC 1240 may close the switch 1260, and thereby may selectively connect the terminal #4 114 to the power unit 1220.

When the external charging device 1200 illustrated in FIG. 12 is connected to another existing model by the authentication IC 1240, a default state of the switch 1260 is off, and the switch 1260 continuously maintains the off state because the existing models do not have a function of communicating with the authentication IC 1240. Accordingly, it is impossible to collide with power of each of the existing models. Since the existing electronic devices do not have a function of communicating with the authentication IC 1240 included in the external charging device 1200 of the present disclosure, a default state of the switch 1260 of the external charging device 1200 can be off in order that the existing electronic devices can use the external charging device 1200.

A power supply terminal may be added according to a control signal Ctrl of the authentication IC 1240. For example, when in a state where the switch 1260 is open, a voltage of 5 V is applied by the power unit 1220 through the default power supply terminal to supply the electronic device with 5 Watts of power, if the switch 1260 is closed, the electronic device may be supplied with a power of up to 10 Watts from the power unit 1220 through the default power supply terminal and the added power supply terminal.

The charging device illustrated in FIG. 12 may include a charger that is capable of changing a charging voltage under the control of the electronic device. Specifically, when an output voltage of the charging device 1200 delivers a voltage change command to the authentication IC 1240 by using 1-wired communication, an output voltage of the power unit 1220 may be changed under the control of the authentication IC 1240.

Because the supply of constant voltage limits the amount of current capable of being received from each terminal, the number of terminals available to deliver power to the electronic device needs to be increased in order to achieve high-capacity/high speed charging. Accordingly, a method of increasing the number of terminals connected by the switch 1260 is useful. Alternatively the amount of power supplied to the terminal may be increased without requiring the use of additional terminals by increasing an output voltage of the power unit 1220. For example, when one terminal is capable of tolerating a current of up to 1 A, if a voltage of 5 V is input, power may be transmitted up to a maximum of 5 W. When a voltage becomes 10 V, power may be transmitted up to a maximum of 10 W.

In other words, when the power unit 1220 is a constant voltage source, the charging device illustrated in FIG. 12 has a fixed voltage. Accordingly, high-speed/high-power charging may be performed in such a manner as to increase the number of connected terminals by using the switch 1260 and increase a maximum amount of current. Alternatively, an increase in voltage may increase charging power.

As described above, according to another aspect of the present disclosure, high-speed/high-capacity charging may selectively support the electronic device through communication between the authentication IC included in the external charging device and the USB interface control circuit included in the electronic device.

Meanwhile, although FIG. 12 explains the charger as an example, by controlling the authentication IC 1240 by using the USB ID terminal, the above-described configuration may be also used for switch control for preventing a collision between signal lines, and the like. The external charging device 1200 illustrated in FIG. 13 may employ a comparator 1230 and predetermined resistor elements $R_{ID1}$ and $R_{ID2}$ instead of the authentication IC 1240 illustrated in FIG. 12. First, the USB interface control circuit 800 recognizes that an accessory connected to the connection unit 100 is the external charging device 1200, through the identification terminal 120.

After the USB interface control circuit 800 recognizes the external charging device 1200 connected to the connection unit 100 as described above, the identification terminal 120 supports communication with the recognized external charging device 1200.

When a connection to the external charging device 1200 is recognized through the identification terminal 120, the USB interface control circuit 800 causes a switch 850 to be closed, and supplies the identification terminal 120 with VBUS or V_BAT signals. Accordingly, a constant current $I_{ID}$ flows through the identification terminal 120, and a divided voltage $V_{ID1}$ is generated by resistor elements $R_{ID1}$ and $R_{ID}$. When the divided voltage $V_{ID1}$ is greater than a reference voltage $V_{ref}$, the comparator 1230 outputs a signal which allows the switch 1260 to be closed. As described above, a power supply terminal may be added according to the output signal of the comparator 1230.

According to another aspect of the present disclosure, high-speed/high-capacity charging may selectively support the electronic device through communication between the comparator included in the external charging device and the USB interface control circuit included in the electronic device.

When the comparator 1230 is used in FIG. 13 as described above, it is advantageous in that the high-speed/high-power charger can be more inexpensively manufactured than in the case of using the authentication IC 1240 illustrated in FIG. 12. Also, instead of controlling the switch 1260 according to the output of the comparator 1230, the output of the comparator 1230 as a control signal of the power unit 1220 may be used to change an output voltage of the power unit 1220.

The above-described electronic device may further include various additional modules according to a form of implementation. Specifically, when the electronic device is a communication terminal, the electronic device may further include elements which have not been described above, such as a short-range communication module for short-range communication, an interface for transmitting and receiving data in a wired communication scheme or a wireless communication scheme of the electronic device, an Internet communication module for communicating with an Internet network and performing an Internet function, a digital broadcasting module for receiving and reproducing a digital broadcast signal, and the like. These elements may be variously modified according to the convergence trend of digital devices, and cannot be all enumerated. However, the electronic device may further include elements equivalent to the above-described elements. Furthermore, a particular configuration may be excluded from the above-described configuration or may be replaced by another configuration according to aspects of the present disclosure. This can be easily understood by those having ordinary knowledge in the technical field of the present disclosure.

Also, examples of the electronic device according to aspects of the present disclosure may include all types of information communication devices, all types of multimedia devices, and application devices for all types of the information communication devices and all types of the multimedia devices, such as all mobile communication terminals operating based on communication protocols matched to various communication systems, a Portable Multimedia Player (PMP), a digital broadcast player, a Personal Digital Assistant (PDA), a music player (e.g., an MP3 player), a portable game console, a smart phone, a laptop computer, a handheld PC, and the like.

As described above, the electronic device supporting the USB interface, according to aspects of the present disclosure, can maintain mechanical/functional compatibility between a USB 2.0 interface and a USB 3.0 interface. Also, the electronic device can recognize a user mode and a factory mode through the USB interface, and according to the recognition, can control power flow between a connector and the electronic device. Further, the electronic device can support an improvement in a high-speed/high-capacity battery charging function through the USB interface. Although various aspects of the disclosure are describe in the context of the USB standard, it is to be understood that the disclosure is not limited to the USB standard. It is further to be understood that the concepts and techniques disclosed herein can be applied to any suitable type of interface.

The above-described aspects of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

Unless otherwise stated, the examples presented herein are not mutually exclusive, but may be implemented in various combinations to achieve unique advantages. As these and other variations and combinations of the features discussed above can be utilized without departing from the disclosed subject matter as defined by the claims, the foregoing description of the embodiments should be taken by way of illustration rather than by way of limitation of the invention as defined by the claims. It will also be understood that the provision of examples (or aspects) of the invention (as well as clauses phrased as "such as," "including," "may," "for example," and the like) should not be interpreted as limiting the invention to the specific examples; rather, the examples are intended to illustrate only one of possible embodiments.

It should be understood by those skilled in the art that many variations and modifications of the method and apparatus described herein will still fall within the spirit and scope of the present disclosure as defined in the appended claims and their equivalents.

What is claimed is:

1. An electronic device comprising: a processor;
a connection unit including a power supply terminal and an identification terminal; a first switch coupled to the power supply terminal and the processor; a second switch coupled to the identification terminal and the processor; and an interface control circuit configured to control an amount of current supplied to the processor by opening or closing each of the first switch and the second switch in accordance with voltage that is applied to at least one of the power supply terminal and the identification terminal by an external device connected to the connection unit, wherein the interface control circuit is further configured to close the second switch while the first switch is open in response to a voltage applied to the identification terminal meeting a predetermined threshold, and the interface control circuit is operated by a largest voltage from among voltages applied through diodes respectively connected to the power supply terminal, the identification terminal, and a battery.

2. The electronic device of claim 1, wherein the interface control circuit is configured to cause the processor to operate in a user mode, when the processor is in the user mode, both the first switch and the second switch are open and power is supplied to the processor over a signal path that does not include any of the first switch and the second switch.

3. The electronic device of claim 2, wherein the interface control circuit is configured to identify a type of the external device based on resistance across a signal path which the identification terminal is part of.

4. The electronic device of claim 1, wherein the interface control circuit is further configured to cause the electronic device to enter a factory mode when no battery is mounted in the electronic device in response to a voltage applied though the identification terminal meeting the predetermined threshold.

5. The electronic device of claim 1, wherein, the interface control circuit is further configured to close the first switch while the second switch is open in response to a voltage applied to the power supply terminal meeting the predetermined threshold.

6. The electronic device of claim 1, further comprising a diode coupled, in parallel with the second switch, to the identification terminal and the processor, wherein the diode is arranged to feed to the processor current for booting the processor.

7. The electronic device of claim 1, wherein the processor is configured to cause the interface control circuit to change a state of at least one of the first switch and the second switch based on an indication of a mode received by the processor form the interface control circuit.

8. The electronic device of claim 1, wherein the interface control circuit is further configured to identify the external device based on a voltage applied to the identification terminal.

9. The electronic device of claim 8, wherein the interfaces control circuit is configured to exchange data with the external device via the identification terminal.

10. The electronic device of claim 9, wherein the external device is a charging device and the interface control circuit is further configured to transmit to the external device an instruction to increase an amount of power supplied by the external device.

* * * * *